Patented Mar. 3, 1936

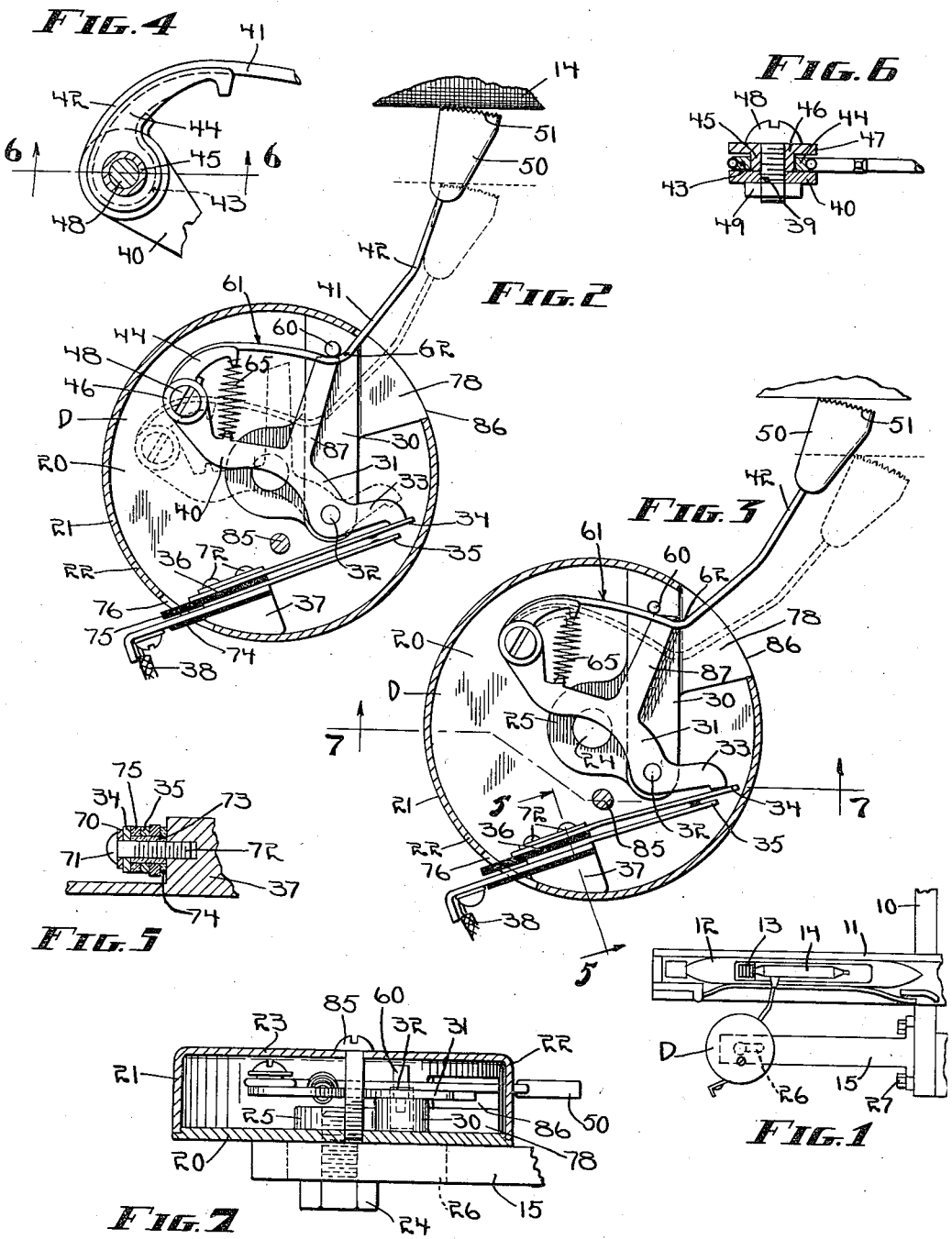

2,033,001

UNITED STATES PATENT OFFICE 2,033,001

SIDE SLIPPING ELECTRICALLY INDICATING WEFT DETECTOR

Oscar V. Payne, Leicester, Mass., assignor to Crompton & Knowles Loom Works, Worcester, Mass., a corporation of Massachusetts Application May 24, 1934, Serial No. 727,302

13 Claims. (Cl. 139—273)

This invention relates to improvements in side slipping weft detectors for looms and it is the general object of the invention to provide a detector of this type which is very light in its action on the yarn.

It has been proposed heretofore to use a side slip feeler to close an electric circuit when indicating exhaustion of a supply of weft, but so far as I am aware previous detectors of this type have been so constructed that a slight movement of the detector in an indicating direction during forward movement thereof will tend to move the electric switch toward closed position. It is an important object of my present invention to construct a weft detector of this type in such a way that as the detector moves forwardly its support will tend to move away from switch closing position. With such a construction should there be a slight lateral displacement of the detector the switch closing tendency of such an action will be counter-acted by the movement of the detector carrier.

During weaving lint is likely to collect on different parts of the loom and tends to gather between electrodes of any switch which is associated with the detector and it is a further object of my invention to construct the detector, its mounting and the switch which it closes in a very compact form so that these parts can be inclosed to keep out lint and any other matter which might interfere with the correct operation of the switch.

In certain types of side slip weft detectors it is necessary to employ two springs, one to restore the detector to normal detecting position after an angular indicating movement, and the other to carry the detector support to normal position after a non-indicating forward displacement. It is an important object of my present invention to provide a single spring which will perform both of these functions in connection with a stop coacting with the detector in such a way as to position the latter as well as its carrier. In this connection I provide the detector with a surface to coact with the stop and so related to the carrier that spring action tends to move the detector surface along the stop to the normal position.

In side slipping weft detectors it is necessary occasionally to adjust the offset of the detector tip to vary the sensitiveness of the detector, and it is a further object of my invention to mount the detector and its carrier, together with the electric contact so that these parts may all be moved at once to facilitate adjustments. These adjustments may be made angularly around a single connection between the detector and its loom support.

With these and other objects in view which will appear as the description proceeds, my invention resides in the combination and arrangement of parts hereinafter described and set forth in the claims.

In the accompanying drawing, wherein a convenient embodiment of my invention is set forth, Fig. 1 is a diagrammatic view of the detector and adjacent loom parts, Fig. 2 is a horizontal section through the detector casing showing the detector in normal and forwardly displaced non-indicating positions, Fig. 3 is a view similar to Fig. 2 but with the detector shown in indicating position, Fig. 4 is an enlarged plan of the pivotal end of the detector, parts being in section, Fig. 5 is a detail vertical section on an enlarged scale on line 5—5 of Fig. 3, Fig. 6 is a vertical section on line 6—6 of Fig. 4, and Fig. 7 is a vertical section on line 7—7 of Fig. 3.

Referring to the drawing, I have shown a loom frame 10 and lay 11 carrying a shuttle 12 in which is mounted a bobbin 13 having a weft supply 14. A bracket 15 projecting laterally from the loom frame supports the detector designated generally herein at D and forming the subject matter of my invention. The detector is of the electrical type and will cooperate with electromagnetic devices through a circuit not shown but well understood. As illustrative of means for controlling looms having electric detectors, reference may be had to my prior Patents Nos. 1,873,468 and 1,929,213.

Referring more particularly to Figs. 2, 3 and 7, it will be seen that the detector comprises a housing having a base 20 and a cover 21 formed with cylindrical side walls 22 and a top 23. A bolt 24 extends through the bracket 15 and into a boss 25 formed integral with the bottom 20, and holds the detector in adjusted angular position on the bracket. A slot 26 in the bracket affords longitudinal adjustment and bolts 27 holding the bracket to the loom afford adjustment toward and from the lay.

The base or bottom 20 is provided with a bearing 30 on which is pivotally mounted a carrier lever 31 moving about a pivot pin 32 in the bearing. The carrier has an arm 33 extending laterally to the right and adapted for cooperation with prongs or electrodes 34 and 35 of an electric switch designated generally at 36. The prongs may be mounted as shown in Fig. 5, where a lug 37 is shown formed integrally with the detector base. Prong 34 engages a metallic plate 70 which is in direct engagement with the head 71 of attaching screws 72. Each of these screws extends through an insulating tube 73 passing through the prong 35 and insulating block 74. An insulating block 75 separates the prongs, and together with prong 35 and block 74 may extend through an opening 76 in the wall of the cover. In this way the two prongs are held tightly to the base of the detector and prong 35 is entirely insulated from all metallic parts of the detector.

I do not wish to be limited to the particular form of electric switch or contact shown herein and it is sufficient for present description to state that movement of arm 33 in a direction toward the switch will close the same and energize an external circuit not shown but including a wire 38. As contemplated herein the base 20 will form a ground return but I do not wish to be limited to this construction, inasmuch as prong 34 may be insulated the same as is prong 35, in which case a wired return would be used.

The carrier has a second arm 40 which extends laterally to the left and provides pivotal support for the detector 41. The latter has the body thereof formed of a wire 42 the left forward end of which is bent and curved as shown in detail in Fig. 4 so as to lie in a peripheral groove 43 formed in a bearing 44. The wire extends around the forward end of the bearing and is bent to the right and rear thereof, as suggested in Fig. 4, and a hole 39 is drilled through the bearing 44 to receive the shank 45 of a second bearing 46 having a shoulder 47. The detector bearing lies between and is confined by arm 40 and shoulder 47, and is free to turn on screw 48. The latter has threaded thereon a nut 49 which holds the parts 46 and 40 together. The rear end of the wire 42 has secured thereto a detector tip 50 which may be formed of any desired material and has detector teeth 51 formed therein to engage the weft supply 14.

Standing up from the bearing 30 is a stop pin 60 which coacts with a rear surface 61 on the wire 42 and also a notch 62. This surface is formed eccentric with respect to the pivot 32 for a purpose to be described. A light compression spring 65 is interposed between the detector bearing 44 and the arm 40 and serves normally to move the detector in a left hand direction around the pivot bearing 46.

In operation, the detector will assume the full line position shown in Fig. 2 and the spring 65 will hold the notched part of the wire 42 against the stop 60. As the lay advances with a full supply of weft the feeler tip will be moved forwardly without angular movement from the full to the dotted line position shown in Fig. 2. The effect of this motion is to move the pivotal connection between the detector and its carrier forwardly to the dotted position shown in Fig. 2. It will be noted that this results in moving the short arm 33 away from the switch. The arm 33 is thus moved positively away from the switch on non-indicating detecting beats of the loom. Because of this action a slight amount of lateral movement to the right on the part of tip 50 will be offset by the normal tendency of detector 33 to move rearwardly and under such conditions there will be no danger that the switch will be accidentally or prematurely closed. As the lay recedes spring 55, which was compressed during the forward stroke, will expand to move the detector wire and tip back to the position shown in full lines in Fig. 2.

When an insufficient supply of weft is present, however, the advancing bare bobbin will strike the feeler as before, but the tip will now move from the full line position in Fig. 2 to the full line position of Fig. 3. This results in turning the carrier 31 in a clockwise direction, forcing arm 33 against prong 34, and the latter against prong 35, thereby establishing electric contact between the prongs. During this motion surface 61 slides along stop 60 and notch 62 is displaced to the right, see Fig. 3, full lines. As the lay continues forwardly carrier will remain substantially at rest, maintaining the contact between the prongs, and the detector will move to the dotted line position, Fig. 3. In this latter movement the wire 42 slides over a support-arm 87 on the carrier, and surface 61 moves forwardly away from the stop 60. Spring 65 is also compressed, causing increased pressure to be exerted on the prongs. As the lay recedes, spring 65 will expand to restore the notched part of wire 42 in engagement with stop 60, after which further recession of the lay will result in wire 42 moving to the left with surface 61 sliding along the stop. The carrier will also move to the left back to normal position and arm 33 will move away from the prongs, thereby permitting them to separate due to their own resilience. During engagement of the prongs, the circuit already alluded to will be closed to effect a change in loom operation, as shown in either of the previously named patents, or in any other approved manner.

While I have shown the surface 61 as slightly curved, yet I do not wish to be held to this form of surface, inasmuch as the detector will return to normal position under action of spring 65 if the part which slides along the stop is not concentric with the center 32 but extends to the left and away from that center.

In actual operation I find it convenient to hold the cover in place by a screw 85 threaded into the base 20. A slot 86 may be formed in the cover to permit swinging movements of the wire 42, and a projection 78 carried by the base extends into the slot 86 to engage the side wall 21 and prevent turning of the cap relatively to the base. The support finger 87 may lie under the detector wire at all times so that the detector and its carrier are in effect a self-contained unit. Angular adjustment of the detector about the stud or bolt 24 affords means for varying the sensitiveness of the detector.

From the foregoing it will be seen that I have provided a very simple side slipping electrically indicating weft detector so constructed that on the forward non-indicating detecting beat the arm 33 will move away from the switch and a condition will exist which will render highly improbable any accidental or premature contact between the prongs 34 and 35. At the time of side slipping to indicate weft exhaustion this arm 33 is swung in the opposite direction to establish connection between the prongs. The stop 60 is so located as to position the detector for normal initial engagement with the surface to be detected and this stop coacts with surface 61 to restore the detector to normal position after an indicating movement. It will be seen that the detector, its pivoted carrier, the stop and switch are all mounted to move around a common center by a single angular movement of the detector housing or base 20 and adjustment of the detector tip to make the same more or less sensitive but the rotation of the housing will simultaneously effect a corresponding movement of all the coacting parts and no other adjustment will be needed. The cap 21 serves to keep out lint and the operating parts are thereby kept free from dirt and in good operating condition, and is held against relative angular movement with respect to the base by the projection 78.

Having thus described my invention it will be seen that changes and modifications may be made therein by those skilled in the art without departing from the spirit and scope of the invention and I do not wish to be limited to the details herein disclosed, but what I claim is:

1. In weft detecting mechanism for a loom having a surface to be detected, a support, a carrier pivoted to the support, a weft detector pivoted to the carrier to engage the surface to be detected and slide along the latter to indicate weft exhaustion and cause pivotal movement of the carrier in one direction, and said detector to move forwardly to cause pivotal movement of the carrier in the opposite direction on non-indicating detecting beats of the loom, and an electric contact to be closed by the carrier when the detector indicates weft exhaustion.

2. In weft detecting mechanism for a loom, a support, an electric contact, a carrier pivotally mounted on the support and movable in two directions relatively to the contact, one toward and the other away from said contact, and a weft detector operatively connected to the carrier and effective on detecting non-indicating beats of the loom to move the carrier away from the contact and effective on indicating detecting beats of the loom to move the carrier toward the contact.

3. In an electrically indicating weft detector, a stand, an electric contact, a carrier pivoted to the stand, an arm on the carrier movable toward and from the contact, a weft detector pivoted to the carrier and effective on indicating detecting beats of the loom to move said arm toward the contact and effective on non-indicating detecting beats of the loom to move said arm away from the contact.

4. In weft detecting mechanism for a loom having a surface to be detected, a detector movable forwardly with the surface on non-indicating detecting beats of the loom and movable laterally along the surface on indicating detecting beats of the loom, an electric contact, and a carrier to close the contact and to which the detector is pivoted, said carrier so constructed and operated as to move away from the contact on non-indicating detecting movements of the detector and to move toward the contact on indicating detecting movements of the detector.

5. In weft detecting mechanism for looms, a support, an electric contact to be closed, a carrier pivotally mounted with respect to the support, a weft detector pivoted to and supported by the carrier and having a detecting surface movable forwardly without substantial lateral movement on non-indicating detecting movements of the loom, and movable laterally on indicating detecting beats of the loom, and a contact closing element moving with the carrier to move toward and close the contact on indicating beats of the loom, and to move away from the contact on detecting non-indicating beats of the loom.

6. In a weft detector for a loom, a support, an electric contact, a carrier pivoted to the support and having an arm extending laterally in one direction to be operatively related to the contact, a second arm on the carrier extending laterally in the opposite direction from the first arm, a side slipping weft detector having a detecting surface to move forwardly without substantial lateral movement on detecting non-indicating beats of the loom and movable laterally on indicating beats of the loom, and a pivotal connection between the detector and the second named arm of the carrier, the first named arm movable toward the contact when the detector moves laterally on indicating beats of the loom and said first named arm moving away from the contact when the detector moves forwardly on non-indicating detecting beats of the loom.

7. In a weft detector for a loom, a stand, a detector carrier, a pivotal connection between the carrier and the stand, a weft detector pivotally connected to and supported by the carrier and having a lateral movement to rock the carrier about its pivotal connection on indicating beats of the loom, a resilient connection between the carrier and the detector, a stop, and a surface movable with the detector and eccentric with respect to said pivotal connection, the resilient connection effective to move said surface against the stop and said surface and stop coacting together with the resilient connection to move the detector back to normal position after an indicating movement of the detector.

8. In a side slipping weft detector for a loom, a support, a carrier, a pivotal connection between the carrier and the support, a weft detector carried by the carrier and having a lateral movement relatively to the pivotal connection on indicating beats of the loom, and means to restore the detector to normal position by a movement opposite to the indicating movement subsequent to indication, said means including a resilient connection between the carrier and the detector, a fixed stop and a surface moving with the detector under influence of the resilient connection against the stop, said surface being eccentric with respect to the pivotal connection.

9. A spring actuated detector element for a side slipping weft detector operating with a guide and having a pivot, said element comprising a wire having a feeler tip secured to the rear end thereof and a bearing secured to the front end thereof, said wire intermediate the tip and bearing being bent to cooperate with the guide, and means on the bearing to receive the thrust of the spring, said bearing being perforated to cooperate with the pivot.

10. A spring actuated detector element for a side slipping weft detector operating with a guide and having a pivot, said element comprising a wire having a feeler tip secured to the rear end thereof and a bearing secured to the front end thereof, said wire intermediate the tip and bearing being bent to cooperate with the guide, and means on the bearing to receive the thrust of the spring, said bearing being perforated to cooperate with the pivot, the bearing being of substantially the same thickness as the diameter of the wire.

11. A spring actuated detector element for a side slipping weft detector operating with a guide and having a pivot, said element comprising a wire having a feeler tip secured to the rear end thereof and a bearing secured to the front end thereof, said wire intermediate the tip and bearing being bent to cooperate with the guide, and means on the bearing to receive the thrust of the spring, said bearing being perforated to cooperate with the pivot, the wire being bent around the bearing at the portion thereof which is perforated.

12. In a side slipping electrically indicating weft detector, a support, a carrier pivoted to the support, a weft detector pivoted to the carrier and movable about the pivot of said carrier toward and from the surface being detected, and an electric contact to be closed by the carrier, the detector movable laterally upon indication of weft exhaustion to cause pivotal movement of the carrier and cause the latter to close the contact.

13. A side slipping detector element for a weft detector having a support and operating with a guide and spring, said element comprising a wire body portion positioned by the spring and movable about the support, a tip on one end of the wire to engage weft, a bearing secured to the other end of the wire and having a hole therein for the support, and a spring guiding lug on the bearing, said wire having a bend between the tip and bearing to engage the guide.

OSCAR V. PAYNE.